(12) United States Patent
Tham

(10) Patent No.: US 10,024,707 B2
(45) Date of Patent: Jul. 17, 2018

(54) ELECTROMAGNETIC FLOWMETER CALIBRATION VERIFICATION

(71) Applicant: Invensys Systems, Inc., Foxboro, MA (US)

(72) Inventor: Alyssa Tham, Milford, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 162 days.

(21) Appl. No.: 15/046,099

(22) Filed: Feb. 17, 2016

(65) Prior Publication Data

US 2017/0234719 A1    Aug. 17, 2017

(51) Int. Cl.
*G01F 1/60* (2006.01)
*G01F 25/00* (2006.01)
*G01F 1/58* (2006.01)

(52) U.S. Cl.
CPC .......... *G01F 25/0007* (2013.01); *G01F 1/584* (2013.01); *G01F 1/588* (2013.01); *G01F 1/60* (2013.01)

(58) Field of Classification Search
CPC ... G01F 1/60; G01F 1/58; G01F 1/588; G01F 1/584; G01F 1/586; G01F 25/0007
See application file for complete search history.

(56) References Cited

U.S. PATENT DOCUMENTS

| | | | | |
|---|---|---|---|---|
| 3,178,941 A | * | 4/1965 | Berry | G01F 1/58 73/861.14 |
| 3,433,066 A | * | 3/1969 | Bailey | G01F 1/58 73/861.16 |
| 3,491,593 A | * | 1/1970 | Bailey | G01F 1/58 73/861.16 |
| 3,589,186 A | * | 6/1971 | Bourg | G01F 1/58 73/861.15 |
| 3,722,274 A | | 3/1973 | Natens et al. | |
| 3,783,687 A | * | 1/1974 | Mannherz | G01F 1/60 73/861.17 |

(Continued)

FOREIGN PATENT DOCUMENTS

JP    S4974856 U    6/1974

OTHER PUBLICATIONS

Extended European Search Report for 17155834.9, dated Jul. 26, 2017.

*Primary Examiner* — David A Rogers
(74) *Attorney, Agent, or Firm* — Senniger Powers

(57) ABSTRACT

A magnetic flowmeter has a conduit, an electrical coil, and a coil driver configured to energize the electrical coil with a periodic electrical signal and generate a magnetic field in the conduit that periodically reverses polarity. Electrodes are arranged to detect a voltage generated by flow of the conductive fluid through the conduit and through the magnetic field. A measurement system receives electrical signals from the electrodes and determines a flow rate of the conductive fluid using the electrical signals. The flowmeter has a meter verification system that includes a sensor configured to detect the magnetic field generated by electrical coil when it is energized by the coil driver. The meter verification system is configured to determine an amplitude of the periodically changing magnetic field and to use this amplitude to assess the current operational effectiveness of the magnetic flowmeter.

21 Claims, 4 Drawing Sheets

(56) References Cited

U.S. PATENT DOCUMENTS

| | | | | |
|---|---|---|---|---|
| 3,902,366 A * | 9/1975 | Gruner | G01F 1/58 | 174/350 |
| 3,999,443 A * | 12/1976 | Appel | G01F 1/58 | 73/861.17 |
| 4,008,609 A * | 2/1977 | Lambrecht | G01F 1/58 | 73/861.13 |
| 4,137,767 A * | 2/1979 | Wada | G01F 1/58 | 73/861.15 |
| 4,147,058 A * | 4/1979 | Matsushita | G01F 1/002 | 73/861.12 |
| 4,206,640 A * | 6/1980 | Suzuki | G01F 1/60 | 73/861.16 |
| 4,357,835 A * | 11/1982 | Kayama | G01F 1/60 | 73/861.17 |
| 4,417,479 A * | 11/1983 | Schmoock | G01F 1/60 | 73/861.16 |
| 4,513,624 A * | 4/1985 | McHale | G01F 1/60 | 73/861.12 |
| 4,631,969 A * | 12/1986 | Schmoock | G01F 1/58 | 73/861.12 |
| 4,704,907 A * | 11/1987 | Mannherz | G01F 1/60 | 73/861.17 |
| 4,741,215 A * | 5/1988 | Bohn | G01F 1/588 | 73/861.12 |
| 5,253,537 A * | 10/1993 | Tomita | G01F 1/60 | 73/861.15 |
| 5,289,725 A * | 3/1994 | Brown | G01F 1/58 | 29/602.1 |
| 5,351,554 A * | 10/1994 | Budmiger | G01F 1/60 | 73/861.16 |
| 5,400,659 A * | 3/1995 | Yokoi | C04B 37/021 | 73/861.08 |
| 5,426,984 A * | 6/1995 | Rovner | G01F 1/002 | 73/861.12 |
| 5,469,746 A * | 11/1995 | Fukunaga | G01F 1/60 | 73/861.12 |
| 5,544,532 A * | 8/1996 | Brown | G01F 1/58 | 73/861.12 |
| 5,570,300 A * | 10/1996 | Henry | G01F 1/8436 | 374/E15.001 |
| 5,824,914 A * | 10/1998 | Seppa | G01F 1/588 | 73/861.11 |
| 6,311,136 B1 * | 10/2001 | Henry | G01F 1/8404 | 702/45 |
| 6,584,859 B1 * | 7/2003 | Brockhaus | G01F 1/584 | 73/861.11 |
| 7,174,256 B2 * | 2/2007 | Brockhaus | G01F 1/58 | 702/38 |
| 7,421,907 B2 * | 9/2008 | Ishikawa | G01F 1/60 | 73/861.11 |
| 2008/0250866 A1 | 10/2008 | Tschabold et al. | | |

* cited by examiner period of 1 cycle

ELECTROMAGNETIC FLOWMETER CALIBRATION VERIFICATION

FIELD OF INVENTION

The present invention relates generally to electromagnetic flowmeters and more specifically to systems and methods for verifying calibration of electromagnetic flowmeters.

BACKGROUND

Electromagnetic flowmeters are commonly used in various industries to measure the flow rate of conductive fluids flowing through pipelines or other conduits. In principle, electromagnetic flowmeters generate a magnetic field in a conduit for flow of fluid through the meter. When conductive fluid flows through the conduit, the magnetic field induces a voltage difference between two locations in the fluid that are spaced apart in a direction transverse to the fluid flow. The magnitude of the voltage difference is related to flow rate. By detecting the voltage difference, fluid flow rate can be measured. The voltage is calibrated to the fluid velocity. The fluid velocity can be used in combination with the cross sectional flow area to obtain a volumetric flow rate measurement. If the density of the fluid is known, the volumetric flow rate can be converted to a mass flow rate.

In some applications, calibration of an electromagnetic meter must be verified on an ongoing basis. Components of an electromagnetic meter may degrade over time. For instance, insulation between the turns of the coils used to generate the magnetic field may degrade and cause shorted turns. Also, magnetic components may shift due to vibrations or for other reasons. These problems and others that may arise over time during use of an electromagnetic flowmeter can affect accuracy of the flow rate measurement. Verification of the meter provides assurance that the meter is still working in good order. Conversely, a meter verification system can identify when an electromagnetic meter is not working properly so that the meter can be taken offline and replaced or repaired.

Some conventional electromagnetic meters include meter verification systems. However, the present inventor has made certain improvements, which will be described in detail below.

SUMMARY

One aspect of the invention is a magnetic flowmeter. The flowmeter has a conduit for passing conductive fluid through the flowmeter. The flowmeter has an electrical coil and a coil driver configured to energize the electrical coil with a periodic electrical signal and generate a magnetic field in the conduit that periodically reverses polarity. A pair of electrodes is arranged to detect a voltage generated by flow of the conductive fluid through the conduit and through the magnetic field. A measurement system is configured to receive electrical signals from the pair of electrodes and determine a flow rate of the conductive fluid using the electrical signals. The flowmeter has a meter verification system including a sensor configured to detect the magnetic field generated by the electrical coil when it is energized by the coil driver. The meter verification system is configured to determine an amplitude of the periodically changing magnetic field and to use said amplitude to assess current operational effectiveness of the flowmeter.

Another aspect of the invention is a method of assessing operational effectiveness of a magnetic flowmeter of the type including a conduit for passing conductive fluid through the flowmeter, an electrical coil, a coil driver configured to energize the electrical coil with a periodic electrical signal and generate a magnetic field in the conduit that periodically reverses polarity, a pair of electrodes positioned to detect a voltage generated by flow of the conductive fluid through the conduit, and a measurement system configured to receive electrical signals from the pair of electrodes and determine a flow rate of the conductive fluid using the electrical signals. The method includes using a sensor to detect the periodically reversing magnetic field. An amplitude of the periodically changing magnetic field is determined. The amplitude is used to assess current operational effectiveness of the flowmeter.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
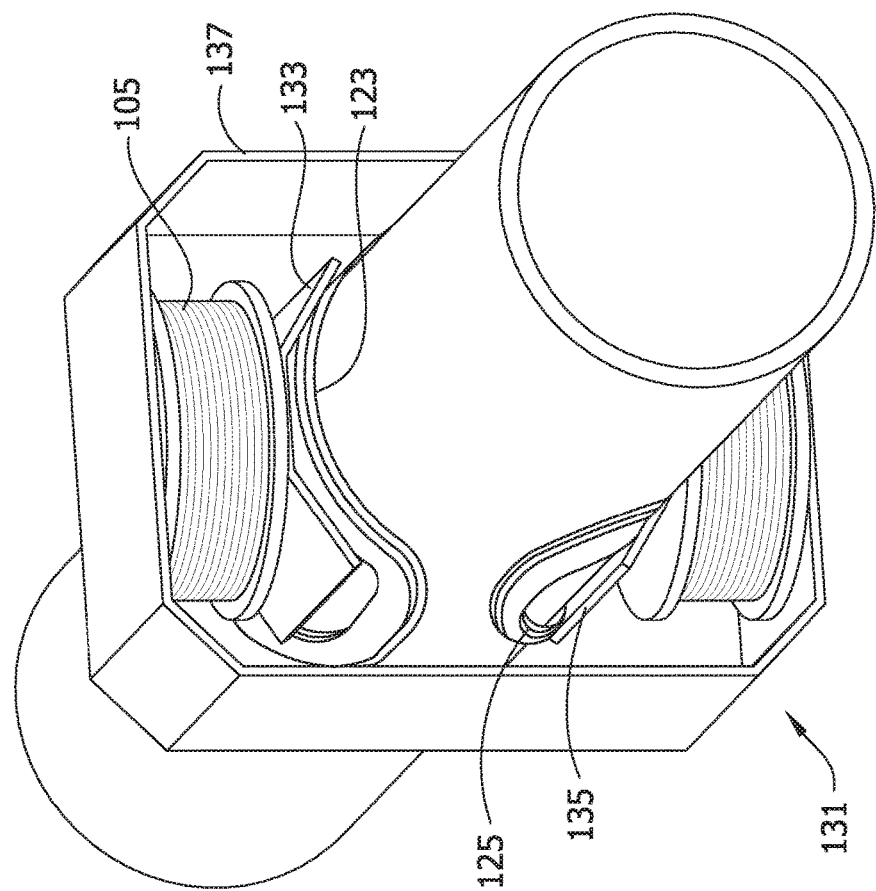
FIG. 1 is a schematic perspective of one embodiment of a magnetic flowmeter of the present invention.
Figure 2:
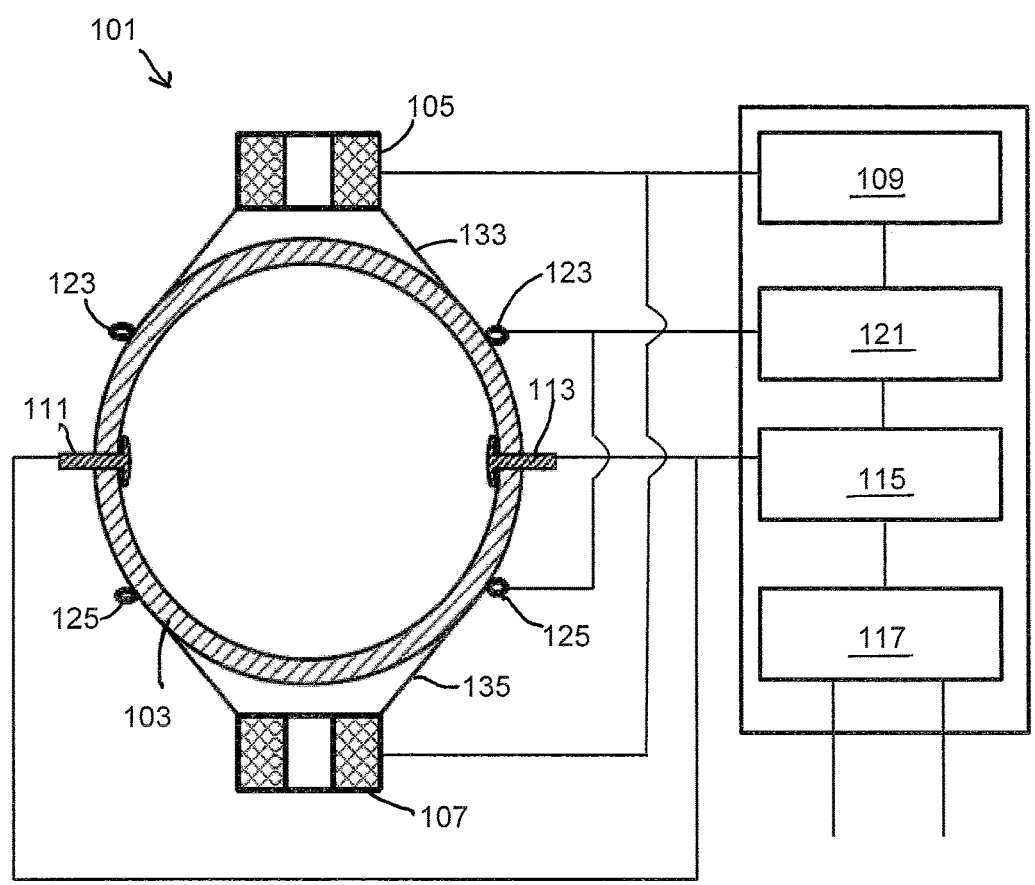
FIG. 2 is a schematic diagram showing one embodiment of an electronic system of the magnetic flowmeter of FIG. 1.
Figure 3:
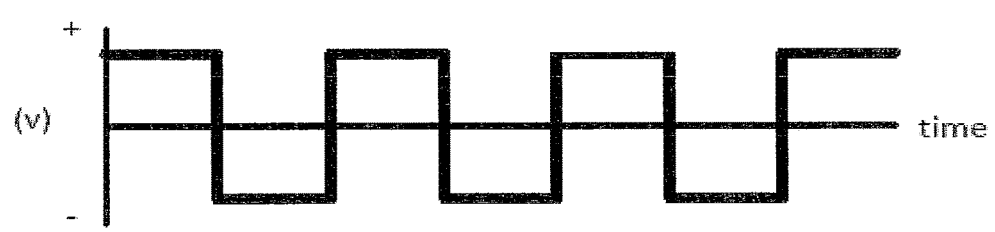
FIG. 3 is a diagram illustrating one embodiment of an electrical signal that is suitable for generating a periodically reversing magnetic field.

One embodiment of a magnetic flowmeter, generally designated 101, is illustrated in FIGS. 1 and 2. The flowmeter 101 has a conduit 103 that is suitable for passing a conductive fluid through the flowmeter. Electrical coils 105, 107 are positioned on opposite sides of the conduit 103. The magnetic flowmeter 101 also has a coil driver 109 (FIG. 2) that is configured to energize the electrical coils 105, 107 to generate a magnetic field that extends through the conduit 103. The orientation of the magnetic field is substantially perpendicular to the direction of fluid flow through the conduit 103. It is possible to omit one of the electrical coils 105, 107 if desired, but using a pair of coils on opposite sides of the conduit in combination to generate the magnetic field facilitates generating a magnetic field that is more uniform and/or symmetrical, at least within the conduit 103 where the magnetic field interacts with the fluid. The coil driver 109 is suitably configured to generate a periodic electrical signal (e.g., a square wave, as illustrated in FIG. 3) that is applied to the coils 105, 107 to generate a magnetic field in the conduit that periodically reverses polarity.

Because of the magnetic field in the conduit 103, a voltage is generated in a conductive fluid as it flows through the magnetic field. A pair of electrodes 111, 113 are arranged to detect the voltage generated by flow of the conductive fluid through the conduit 103 and through the magnetic field therein. The flowmeter 101 has a measurement system 115 configured to receive electrical signals from the electrodes 111, 113 and determine a flow rate of the conductive fluid using the electrical signals. One of the benefits of reversing the polarity of the electrical field is that this can help ameliorate the effects of stray magnetic fields, such as the earth's magnetic field and magnetic fields that may be generated by other equipment in the environment of the flowmeter 101, and thereby improve the flow rate measurement. The difference in the magnitude of the voltage detected when the magnetic field has its reversed polarity and its non-reversed polarity is then used as the basis for the flow rate measurement. The flowmeter 101 suitably has a transmitter 117 configured to output the flow rate measurement data, and optionally additional information such as diagnostic information, to another electrical system. For example, the flowmeter is suitable for use in a distributed control system (not shown), in which case the transmitter 117 is suitably configured to communicate with the distributed control system.

The flow rate measurement is based on the principle that the strength of the electrical field generated in the conductive fluid flowing through the conduit 103 (e.g., the voltage detected by the electrodes 111, 113) can be correlated with the flow rate. When the flowmeter 101 is new, the measurement system 115 is calibrated so the electrical signals from the electrodes 111, 113 can be converted into accurate flow rate measurements. Over time, the flowmeter 101 calibration can deteriorate. One of the primary causes of calibration error is changes in the electronics of the flowmeter that affect the characteristics of the magnetic field generated by the coils 105, 107. For example, vibrations may shake wires until they become loose. Loose wires and/or conductive fluid leaks may short out one or more components of the flowmeter 101. Insulation can deteriorate and/or become dislodged. The physical position of various components can shift over time. The performance can deteriorate for other reasons as well. Changes in the way the magnetic flowmeter 101 is operating can cause the calibration to be off. This in turn leads to inaccurate flowrate measurements.

Figure 4:
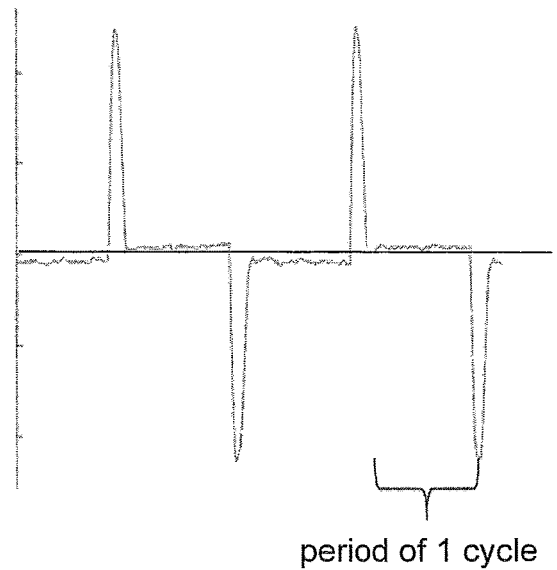
FIG. 4 is a diagram illustrating an electrical signal generated by one embodiment of a sensor for detecting a magnetic flux associated with the periodically reversing magnetic field.

The flowmeter 101 has a meter verification system 121 configured to perform a diagnostic test to evaluate the meter calibration. As illustrated, the meter verification system 121 includes a sensor 123 configured to detect the changing magnetic flux associated with the magnetic field generated by electrical coils 105, 107 when they are energized by the coil driver 109. For example, the sensor 123 is suitably an electrical coil positioned to detect a change in the magnetic flux generated by the coil driver 109 and the coils 105, 107. In the illustrated embodiment, the meter verification system 121 includes a pair of electrical coils 123, 125 positioned to detect a change in the magnetic flux generated by the coil driver 109 and the coils 105, 107. The coils 123, 125 are passive electrical coils that generate electrical voltage in response to a change in magnetic flux passing through the coils. For example, the coils 123, 125 of the meter verification system 121 are suitably configured to experience an induced voltage that is proportional to a rate of change of the magnetic flux (e.g., per Faraday's law in which the induced voltage across a coil (v) is proportional to the number of turns in the coil (N) and the rate of change of magnetic flux ($\Phi$) through the coil ($v=N \cdot d\Phi/dt$)). One example of an electrical signal generated by one of the sensing coils 123, 125 is illustrated in FIG. 4. Alternatively, the sensor(s) of the meter verification system can be a magnetometer that measures the strength of the magnetic field instead of the rate of change of the magnetic flux.

The electrical coils 123, 125 can be positioned anywhere in the magnetic circuit 131 of the flowmeter. In the illustrated embodiment, the magnetic circuit includes the coils 107, 109, pole pieces 133, 135 positioned between the coils and the conduit 103 (which help distribute the magnetic field more uniformly in the conduit), the conduit and its interior, and a magnetic return 137. As is known to those skilled in the art, a magnetic return 137 is a structure extending around the outside of the conduit 103 (e.g. from the outer end of electrical coil 107 to the outer end of electrical coil 109) to guide magnetic flux between the outer ends of the electrical coils. Although the sensors 123, 125 of the meter verification system 121 can be positioned anywhere in the magnetic circuit, in the embodiment illustrated in FIG. 1, the coils 123, 125 of the meter verification system 121 are positioned on the conduit 103 and/or supported by the conduit. The coils 123, 125 of the meter verification system are also positioned on opposite sides of the conduit 103. The coils 123, 125 of the meter verification system a suitably have substantially fewer turns than the coils 105, 107 used to generate the magnetic field. For example, the coils 123, 125 of the meter verification system 121 each suitably have a single loop. The coils 123, 125 of the meter verification system 121 are suitably larger in length and circumscribe an area larger than the area circumscribed by the coils 105, 107 that are used to generate the magnetic field. As illustrated the coils 123, 125 of the meter verification system are saddle shaped and conform to the outer surface of the conduit 103. The coils 123, 125 of the meter verification system 121 are also suitably arranged co-axially with the coils 105, 107 that are used to generate the magnetic field. The arrangement of the coils 123, 125, 105, 107 facilitates manufacture of the flowmeter 101 because the coils 123, 125 of the meter verification system 121 can be wound using the same bobbin as the coils 105, 107 that are used to generate the magnetic field.

The meter verification system 121 is suitably configured to determine an amplitude of the periodically changing magnetic flux generated by the coils 105, 107 and to use the determined amplitude to assess the current operational effectiveness of the magnetic flowmeter 101. For example, the meter verification system 121 is suitably configured to integrate the voltage generated in the coils 123, 125 over one period 161 (FIG. 4) to determine the amplitude of the periodically changing magnetic flux. Alternatively, the meter verification system is configured to use the maximum magnetic field strength (or ½ the absolute value of the difference between the magnetic field strength when the field is reversed and non-reversed) as detected by the magnetometer during each cycle as a measure of the amplitude. The meter verification system 121 suitably determines whether or not the meter 101 is operating properly by comparing a recent amplitude value of the magnetic flux associated with the magnetic field to a corresponding historical amplitude value. If the flowmeter 101 fails to generate a magnetic field that is about equal to the strength of the magnetic field generated during meter calibration, then the calibration will be off and the meter 101 will not produce accurate flow rate measurements. It is expected that there may be small deviations in the strength of the magnetic field which can be negligible. Thus, the meter verification system is suitably configured to compare the current amplitude measurement to a threshold amplitude value based on the historical amplitude measurement taken from a time when the flowmeter 101 was calibrated. For example, the threshold amplitude value is suitably about within about 99-101 percent of the amplitude value when the flowmeter 101 was calibrated. The meter verification system 121 is suitably configured to activate an alarm 141 when the amplitude of the periodically changing magnetic flux detected by a sensor drops below the threshold value. Similarly, the meter verification system is suitably configured to activate an alarm 141 when the amplitude of the periodically changing magnetic flux rises above a threshold value. The alarm can be an alarm that includes an audible or visible alert that is perceptible by humans in the vicinity of the flowmeter 101 and/or the alarm can be an electronic signal (e.g., to a distributed control system) that indicates the flowmeter has failed to verify its calibration. Alternatively or additionally, the meter verification system 121 is suitably configured to output a status messaged indicative of the assessed current operational effectiveness of the flowmeter 101. For example, when the amplitude of the periodically changing magnetic flux is within an expected range the status message suitably indicates the meter 101 is currently operating normally. Likewise, when the amplitude of the periodically changing magnetic flux is outside the expected range, the status message suitably indicates that the flowmeter 101 is not operating properly and/or that corrective action may be required.

Alternatively, the meter verification system can use one of the coils 105, 107 to measure the magnetic field generated by the other of the coils 105, 107. For example, the sensing coils 123, 125 can be omitted and the flowmeter 101 can be configured to operate in a normal measurement mode and a test mode. The coil driver 109 is suitably configured to energize both of the coils 105, 107 during operation in the normal measurement mode so that the magnetic field is generated collectively by both coils during normal measurement mode. However, the coil driver 1099 is suitably configured to energize only one of the coils 105, 107 during operation in test mode. The meter verification system 121 is suitably configured to use the other of the coils 105, 107 (i.e., the non-energized coil) to detect magnetic flux associated with the magnetic field during operation in the test mode. The meter verification system 121 can suitably be configured to test operation of each coil 105, 107 by first energizing coil 105 while using coil 107 to evaluate the ability of coil 105 to generate its share of the normal magnetic field in a first part of the test mode and then energizing coil 107 while using coil 105 to evaluate the ability of coil 107 to generate its share of the normal magnetic field during a second part of the test mode. The meter verification system is suitably configured to activate the alarm if either of the coils 105, 107 fails its part of the test.

Figure 5:
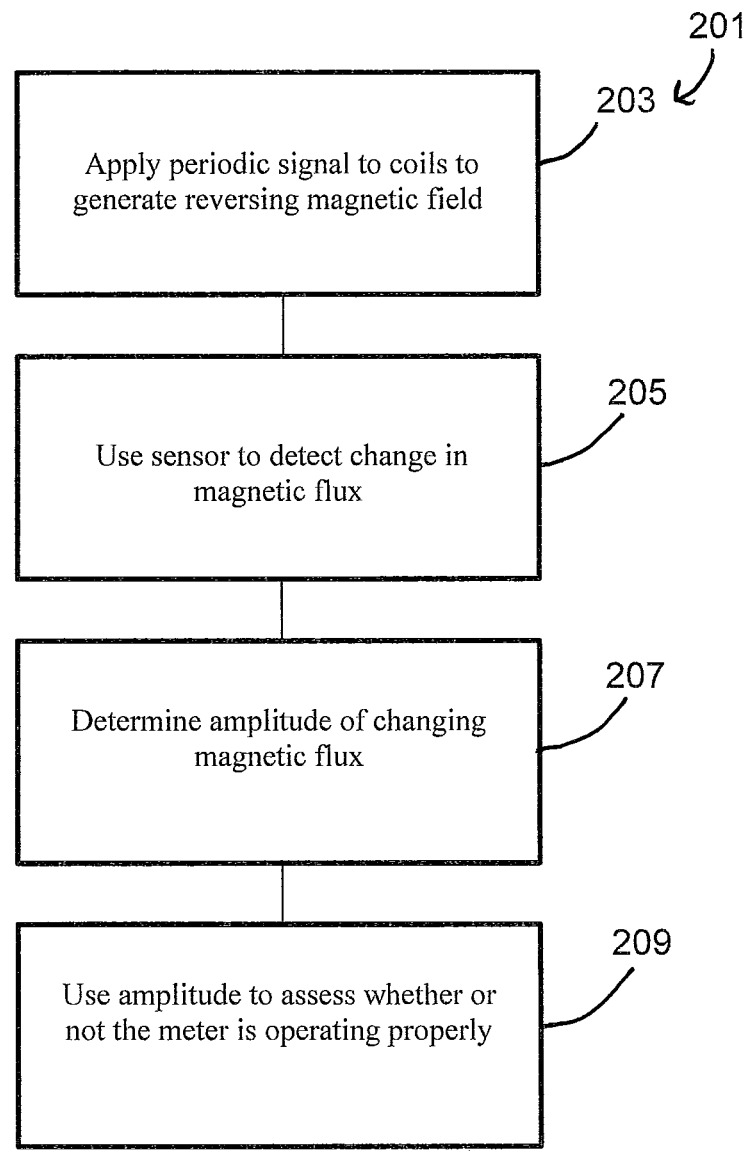
FIG. 5 is a flow diagram illustrating one embodiment of a method of verifying calibration of a magnetic flowmeter.

A method 201 of verifying a flowmeter 101 is illustrated in FIG. 5. During operation of the flowmeter, the coil driver 109 and measurement system 115 operate in a conventional manner to measure flow rate of a conductive fluid through the conduit. In particular, the coil driver 109 applied a periodic signal to the coils 105, 107 to generate a periodically reversing magnetic field, as indicated at 203. The sensor(s) of the meter verification system 121 (e.g., the sensing coils 123, 125 described above) provide a basis to determine whether or not the flowmeter is operating properly (e.g., to assess whether or not the meter calibration can be verified). The sensors 123, 125 detect the periodically changing magnetic flux associated with the magnetic field generated by electrical coils 105, 107 and the coil driver 109, as indicated at 205. The meter verification system 121 determines an amplitude of the periodically changing magnetic flux, as indicated at 207. For example, when sensing coils 123, 125 that cannot detect the magnetic field itself, but which detect changes in the magnetic flux associated with the periodically reversing magnetic field, the meter verification system suitably integrates the voltages induced in the sensing coils over one cycle to determine the amplitude. Alternatively, if a magnetometer is used as sensor for the meter verification system, amplitude is determined by the magnitude of the magnetic field strength measured by the magnetometer. The amplitude is then used to assess whether or not the meter 101 is operating properly, as indicated at 209. The amplitude is suitably compared to an amplitude value that is based on a historical amplitude (e.g., an amplitude from when the meter was initially calibrated). For example, if the amplitude drops below a threshold value (e.g., 99 percent of the amplitude during initial calibration), the meter verification system 121 suitably determines that the meter is not operating properly. Optionally, the meter verification system 121 activates an alarm when the meter is not operating properly.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment.

Embodiments of the aspects of the invention may be described in the general context of data and/or processor-executable instructions, such as program modules, stored on one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When an apparatus is described herein as being "configured to" do a specified function, this means that the apparatus has an existing capability to do whatever is specified and includes, without limitation, an apparatus that performs that function automatically and also an apparatus that does not automatically perform that function but has an existing capability to perform that function when activated to do so without requiring any additional programming, firmware, or electrical components to support the specified function.

Throughout the specification and claims, terms such as "item," "element," "object," etc. may be used interchangeably to generically describe or identify software or display features unless otherwise indicated.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

The invention claimed is:

1. A magnetic flowmeter comprising:
   a conduit for passing conductive fluid through the flowmeter;
   an electrical coil;
   a coil driver configured to energize the electrical coil with a periodic electrical signal and generate a magnetic field in the conduit that periodically reverses polarity;
   a pair of electrodes arranged to detect a voltage generated by flow of the conductive fluid through the conduit and through the magnetic field;
   a measurement system configured to receive electrical signals from the pair of electrodes and determine a flow rate of the conductive fluid using the electrical signals; and
   a meter verification system comprising a sensor configured to detect the magnetic field generated by the electrical coil when it is energized by the coil driver, the meter verification system being configured to determine an amplitude of the periodically changing magnetic field and to use said amplitude to assess the current operational effectiveness of the magnetic flowmeter.

2. A magnetic flowmeter as set forth in claim 1 wherein the electrical coil is a first electrical coil and the sensor comprises a second electrical coil, the second electrical coil being positioned to detect a change in the magnetic flux amplitude associated with the periodically reversing magnetic field.

3. A magnetic flowmeter as set forth in claim 2 wherein the second electrical coil is a passive electrical coil that experiences an induced voltage in response to a change in magnetic flux.

4. A magnetic flowmeter as set forth in claim 2 wherein the second electrical coil is supported by the conduit.

5. A magnetic flowmeter as set forth in claim 2 wherein the second electrical coil is configured to generate an induced voltage that is proportional to a rate of change of the magnetic flux and the meter verification system is configured to integrate said voltage to determine the amplitude of the periodically changing magnetic flux.

6. A magnetic flowmeter as set forth in claim 2 wherein the second electrical coil is positioned coaxially with the first electrical coil.

7. A magnetic flowmeter as set forth in claim 2 wherein the second electrical coil has a single loop.

8. A magnetic flowmeter as set forth in claim 2 wherein the sensor further comprises a third electrical coil, the third electrical coil being positioned to detect a change in magnetic flux associated with the periodically reversing magnetic field.

9. A magnetic flowmeter as set forth in claim 8 wherein the second and third electrical coils are positioned on opposite sides of the conduit.

10. A magnetic flowmeter as set forth in claim 9 wherein the flowmeter further comprises a fourth electrical coil positioned on the opposite side of the conduit as the first electrical coil, the coil driver being configured to energize the first and fourth electrical coils with the periodic electrical signal to generate the periodically-reversing magnetic field using the first and fourth electrical coils in combination.

11. A magnetic flowmeter as set forth in claim 10 wherein the second and third electrical coils are positioned on the conduit and are arranged co-axially with the first and fourth electrical coils.

12. A magnetic flowmeter as set forth in claim 11 wherein the second and third electrical coils each have a single loop.

13. A magnetic flowmeter as set forth in claim 2 wherein the flowmeter is configured to operate in a normal measurement mode and a test mode, the coil driver being configured to energize both of the first and second coils during operation in the normal measurement mode so that the first and second coils collectively generate the magnetic field during operation in normal measurement mode, and to energize only one of the first and second coils during operation in the test mode, the meter verification system being configured to use the other of the first and second coils to detect magnetic flux associated with the magnetic field during operation in the test mode.

14. A magnetic flowmeter as set forth in claim 1 wherein the sensor comprises a magnetometer positioned to measure the magnetic field generated by the electrical coil.

15. A magnetic flowmeter as set forth in claim 1 wherein the meter verification system is configured to compare the amplitude of the periodically changing magnetic field detected by the sensor to an amplitude value based on a historical amplitude of the magnetic field to assess the current operational effectiveness of the magnetic flowmeter.

16. A magnetic flowmeter as set forth in claim 15 wherein the meter verification system is configured to activate an alarm when the amplitude of the periodically changing magnetic field detected by a sensor drops below or above a threshold value based on said historical amplitude.

17. A magnetic flowmeter as set forth in claim 15 wherein the meter verification system is configured to output a status message indicative of the assessed current operational effectiveness of the magnetic flowmeter.

18. A method of assessing operational effectiveness of a magnetic flowmeter of the type comprising a conduit for passing conductive fluid through the flowmeter; an electrical coil; a coil driver configured to energize the electrical coil with a periodic electrical signal and generate a magnetic field in the conduit that periodically reverses polarity; a pair of electrodes positioned to detect a voltage generated by flow of the conductive fluid through the conduit; and a measurement system configured to receive electrical signals from the pair of electrodes and determine a flow rate of the conductive fluid using the electrical signals, the method comprising:
using a sensor to detect a the periodically reversing magnetic field;
determining an amplitude of the periodically changing magnetic field; and
using said amplitude to assess the current operational effectiveness of the magnetic flowmeter.

19. A method as set forth in claim 18 wherein the electrical coil is a first electrical coil and the sensor comprises a second electrical coil, wherein using the sensor comprises detecting a voltage induced by a change in magnetic flux associated with the periodically reversing magnetic field, and wherein determining an amplitude of the periodically changing magnetic field comprises integrating said voltage over one cycle.

20. A method as set forth in claim 18 wherein the sensor comprises a magnetometer.

21. A method as set forth in claim 18 wherein using the amplitude to determine whether or not the magnetic flowmeter is operating properly comprises comparing a recent amplitude value to a historical amplitude value.

* * * * *